United States Patent
Yoshida et al.

(10) Patent No.: US 7,205,778 B2
(45) Date of Patent: Apr. 17, 2007

(54) ELECTROSTATIC CAPACITANCE DETECTING DEVICE

(75) Inventors: Hiroyuki Yoshida, Hitachinaka (JP); Mitsutoshi Miyasaka, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 11/350,726

(22) Filed: Feb. 10, 2006

(65) Prior Publication Data

US 2006/0125490 A1   Jun. 15, 2006

Related U.S. Application Data

(62) Division of application No. 10/825,377, filed on Apr. 16, 2004.

(30) Foreign Application Priority Data

| Apr. 17, 2003 | (JP) | ............................. 2003-112793 |
| Feb. 25, 2004 | (JP) | ............................. 2004-50148 |

(51) Int. Cl.
*G01R 27/08* (2006.01)
(52) U.S. Cl. ....................... 324/662; 324/658; 324/686
(58) Field of Classification Search ..................... None
See application file for complete search history.

(56) References Cited

U.S. PATENT DOCUMENTS

| 6,049,620 | A | 4/2000 | Dickinson et al. | ........... 382/124 |
| 6,411,727 | B1 | 6/2002 | Harkin | ........................ 382/124 |
| 6,657,269 | B2 | 12/2003 | Migliorato et al. | ......... 257/419 |

FOREIGN PATENT DOCUMENTS

| CN | 1268719 A | 10/2000 |
| EP | 1 041 356 A1 | 10/2000 |
| JP | A 11-118415 | 4/1999 |
| JP | A 2000-346608 | 12/2000 |
| JP | A 2000-346610 | 12/2000 |
| JP | A 2001-56204 | 2/2001 |

(Continued)

OTHER PUBLICATIONS

Hashido, Ryuichi et al., "A Capacitive Fingerprint Sensor Chip Using Low-Temperature Poly-Si TFTs on a Glass Substrate and a Novel and Unique Sensing Method," IEEE Journal of Solid-State Circuits, IEEE Inc., New York, U.S. vol. 38, No. 2, Feb. 2003, pp. 274-280.

(Continued)

*Primary Examiner*—Andrew H. Hirshfeld
*Assistant Examiner*—John Zhu
(74) *Attorney, Agent, or Firm*—Oliff & Berridge, PLC

(57) ABSTRACT

The invention provides an electrostatic capacitance detection device. The electrostatic capacitance detection device can be formed of M individual power supply lines, N individual output lines, arranged in a matrix of M rows×N columns, and electrostatic capacitance detection elements provided on the crossing points of the individual power supply lines and the individual output lines, each of the electrostatic capacitance detection elements is formed of a signal detection element and a signal amplification element, the signal detection element is formed of a capacitance detecting electrode and a capacitance detecting dielectric layer, the signal amplification element formed of a metal-insulator-semiconductor (MIS) type thin film semiconductor device for signal amplification, including a gate electrode, a gate insulating layer and a semiconductor layer.

6 Claims, 9 Drawing Sheets

FOREIGN PATENT DOCUMENTS

| | | |
|---|---|---|
| JP | A 2001-133213 | 5/2001 |
| JP | A 2003-254706 | 9/2003 |
| JP | A 2004-089675 | 3/2004 |
| JP | A 2004-102511 | 4/2004 |
| WO | WO 01/06448 A1 | 1/2001 |

OTHER PUBLICATIONS

Inglis, C. et al., "A Robust, 1.8V 250µ W Direct-Contact 500dpi Fingerprint Sensor", Solid-State Circuits Conference, 1998, Digest of Technical Papers. 1998 IEEE Intl. San Francisco, CA, USA Feb. 5-7, 1998, pp. 284-285.

ELECTROSTATIC CAPACITANCE DETECTING DEVICE

This is a Divisional of application Ser. No. 10/825,377 filed Apr. 16, 2004. The entire disclosure of the prior application is hereby incorporated by reference herein in its entirety.

BACKGROUND OF THE INVENTION

1. Field of Invention

The present invention relates to an electrostatic capacitance detection device, which reads surface contours of an object having a fine indentation, such as a fingerprint, by detecting an electrostatic capacitance, which changes according to the distance from the surface of the object.

2. Description of Related Art

Conventionally, an electrostatic capacitance detection device used for fingerprint sensor or the like is formed of a sensor electrode and a dielectric layer, provided on the sensor electrode, on a single crystal silicon substrate. See, for example, Japanese laid-open patent publication No. 11-118415, No. 12-346608, No. 13-56204 and No. 13-133213). FIG. 1 shows an operating principle of the conventional electrostatic capacitance detection device. A sensor electrode and a dielectric layer form an electrode and a dielectric layer of a capacitor, and a human body becomes the other electrode, which is grounded. The electrostatic capacitance $C_F$ of this capacitor changes depending on the indentation of a fingerprint contacting the surface of the dielectric layer. A capacitor having the electrostatic capacitance $C_S$ is prepared on the semiconductor substrate, and the two capacitors are coupled in series and a predetermined voltage is applied thereon. This allows an electric charge Q to be generated between the two capacitors depending on the indentation of the fingerprint. The electric charge Q can be detected using a usual semiconductor technology, and surface contours of the object can be read.

SUMMARY OF THE INVENTION

However, because the conventional electrostatic capacitance detection devices are formed on a single crystal silicon substrate, there has been a problem that the devices are cracked when a finger is strongly pressed thereon when used for a fingerprint sensor. Furthermore, the fingerprint sensor inevitably requires a size of approximately 20 mm×20 mm for its application, and most of the area of the electrostatic capacitance detection device is dominated by a sensor electrode. The sensor electrode is, of course, formed on the single crystal silicon substrate, however, most area of the single crystal silicon substrate (beneath the sensor electrode), which is produced by consuming large amount of resources and labor, only plays a role of a supporting body. In other words, there has been a problem that the conventional electrostatic capacitance detection devices are not only expensive, but also have a large amount of waste and expense associated with their manufacture.

In addition, it is recently required strongly that a personal authenticating function is provided on cards, such as credit card and cash card, to enhance safety of cards. However, there has been a problem that the electrostatic capacitance detection devices manufactured on the conventional single crystal silicon substrate is not so flexible, therefore, the devices cannot be manufactured on a plastic substrate.

An object of the present invention is to provide an electrostatic capacitance detection device, which can operate stably, reduce unnecessary energy and labor during manufacturing, and can be manufactured on substrates other than the single crystal silicon substrate.

The invention is an electrostatic capacitance detection device for reading surface contours of an object by detecting an electrostatic capacitance, which changes according to the distance from the object. The electrostatic capacitance detection device can be formed of M individual power supply lines and N individual output lines, arranged in a matrix of M rows×N columns, and electrostatic capacitance detection elements provided on the crossing points of the individual power supply lines and the individual output lines. Each of the electrostatic capacitance detection elements can be formed of a signal detection element and a signal amplification element, the signal detection element is formed of a capacitance detecting electrode, a capacitance detecting dielectric layer and a reference capacitor. The reference capacitor can be formed of a reference capacitor first electrode, a reference capacitor dielectric layer and a reference capacitor second electrode. The signal amplification element is formed of a MIS type thin film semiconductor device for signal amplification, including a gate electrode, a gate insulating layer and a semiconductor layer. Furthermore, a drain region of the MIS type thin film semiconductor device for signal amplification is connected to each of the individual power supply lines and the reference capacitor first electrode, and a gate electrode of the MIS type thin film semiconductor device for signal amplification is connected to the capacitance detecting electrode and the reference capacitor second electrode. A source region of the MIS type thin film semiconductor device for signal amplification is connected to the each of the individual output lines directly, or indirectly through a switching element. In the present invention, the dielectric layer of the reference capacitor and the gate insulating layer of the MIS type thin film semiconductor device for signal amplification are formed with a same material on a same layer. Furthermore, the reference capacitor first electrode and the semiconductor layer drain region are formed with a same material on a same layer. Furthermore, the reference capacitor second electrode and the gate electrode are formed with a same material on a same layer.

In the invention, using an area of the reference capacitor electrode of $S_R$ (μm²), a gate area of the MIS type thin film semiconductor device for signal amplification of $S_T$ (μm²), a thickness of the reference capacitor of $t_R$ (μm), a dielectric constant of the reference capacitor dielectric layer of $\epsilon_R$, a thickness of the gate insulating layer of $t_{ox}$ (μm), a dielectric constant of the gate insulating layer of $\epsilon_{ox}$, the capacitance $C_R$ of the reference capacitor and the transistor capacitance of $C_T$ of the MIS type thin film semiconductor device for signal amplification are defined as $$C_R = \epsilon_0 \cdot \epsilon_R \cdot S_R / t_R,$$

$$C_T = \epsilon_0 \cdot \epsilon_{ox} \cdot S_T / t_{ox}$$

where $\epsilon_0$ is the permittivity in vacuum, respectively, and using an area of the capacitance detecting electrode of $S_D$ (μm²), a thickness of the capacitance detecting dielectric layer of $t_D$ (μm), a dielectric constant of the capacitance detecting dielectric layer of $\epsilon_D$, the element capacitance $C_D$ of the signal detection element is defined as $$C_D = \epsilon_0 \cdot \epsilon_D \cdot S_D / t_D$$

where $\epsilon_0$ is the permittivity in vacuum, and the element capacitance $C_D$ is sufficiently larger than $C_R + C_T$, a summation of the capacitance $C_R$ of the reference capacitor and the transistor capacitance $C_T$. Sufficiently large generally means a difference of approximately ten times or more, therefore, in other words, the element capacitance $C_D$ satisfies a relation of $$C_D > 10 \times (C_R + C_T),$$

whereas $C_R + C_T$ is a summation of the capacitance $C_R$ of the reference capacitor and the transistor capacitance $C_T$. In the electrostatic capacitance detection device according to the present invention, the capacitance detecting dielectric layer is preferably located on the uppermost surface of the electrostatic capacitance detection device. When the object is apart from the capacitance detecting dielectric layer with an object distance of $t_A$ without contacting the capacitance detecting dielectric layer, the capacitance $C_A$ of the object is defined as $$C_A = \epsilon_0 \cdot \epsilon_A \cdot S_D / t_A.$$

using the permittivity in vacuum of $\epsilon_0$, a dielectric constant of air of $\epsilon_A$, and an area of the capacitance detecting electrode of $S_D$, then the electrostatic capacitance detection device is configured so that $C_R + C_T$, a summation of the capacitance $C_R$ of the reference capacitor and the transistor capacitance $C_T$, is sufficiently larger than the capacitance $C_A$ of the object. As described above, if a difference of approximately ten times or more is recognized, it means sufficiently large, therefore, $C_R + C_T$, a summation of the capacitance $C_R$ of the reference capacitor and the transistor capacitance $C_T$, and the capacitance $C_A$ of the object satisfy a relation of $$(C_R + C_T) > 10 \times C_A.$$

More ideally, the capacitance detecting dielectric layer is located on the uppermost surface of the electrostatic capacitance detection device, and using an area of the reference capacitor electrode of $S_R$ ($\mu m^2$), a gate area of the MIS type thin film semiconductor device for signal amplification of $S_T$ ($\mu m^2$), a thickness of the reference capacitor of $t_R$ ($\mu m$), a dielectric constant of the reference capacitor dielectric layer of $\epsilon_R$, a thickness of the gate insulating layer of $t_{ox}$ ($\mu m$), a dielectric constant of the gate insulating layer of $\epsilon_{ox}$, the capacitance $C_R$ of the reference capacitor and the transistor capacitance of $C_T$ of the MIS type thin film semiconductor device for signal amplification are defined as $$C_R = \epsilon_0 \cdot \epsilon_R \cdot S_R / t_R,$$

$$C_T = \epsilon_0 \cdot \epsilon_{ox} \cdot S_T / t_{ox}$$

where $\epsilon_0$ is the permittivity in vacuum, respectively, and using an area of the capacitance detecting electrode of $S_D$ ($\mu m^2$), a thickness of the capacitance detecting dielectric layer of $t_D$ ($\mu m$), a dielectric constant of the capacitance detecting dielectric layer of $\epsilon_D$, the element capacitance $C_D$ of the signal detection element is defined as $$C_D = \epsilon_0 \cdot \epsilon_D \cdot S_D / t_D$$

where $\epsilon_0$ is the permittivity in vacuum, and the element capacitance $C_D$ is sufficiently larger than $C_R + C_T$, a summation of the capacitance $C_R$ of the reference capacitor and the transistor capacitance $C_T$, and when the object is apart from the capacitance detecting dielectric layer with an object distance of $t_A$ without contacting the capacitance detecting dielectric layer, the capacitance $C_A$ of the object is defined as $$C_A = \epsilon_0 \cdot \epsilon_A \cdot S_D / t_A$$

using the permittivity in vacuum of $\epsilon_0$, a dielectric constant of air of $\epsilon_A$, and an area of the capacitance detecting electrode of $S_D$, then the electrostatic detection device is configured so that $C_R + C_T$, a summation of the capacitance $C_R$ of the reference capacitor and the transistor capacitance $C_T$, is sufficiently larger than the capacitance $C_A$ of the object. More specifically, the electrostatic capacitance detection device is configured so that the element capacitance $C_D$, $C_R + C_T$, a summation of the capacitance $C_R$ of the reference capacitor and the transistor capacitance $C_T$, and the capacitance $C_A$ of the object satisfy a relation of $$C_D > 10 \times (C_R + C_T) > 100 \times C_A.$$

The invention is an electrostatic capacitance detection device for reading surface contours of an object by detecting an electrostatic capacitance, which changes according to the distance from the object, wherein the electrostatic capacitance detection device is formed of M individual power supply lines and N individual output lines, arranged in a matrix of M rows×N columns, and electrostatic capacitance detection elements provided on the crossing points of the individual power supply lines and the individual output lines. Each of the electrostatic capacitance detection elements can be formed of a signal detection element and a signal amplification element. The signal detection element is formed of a capacitance detecting electrode, a capacitance detecting dielectric layer and a reference capacitor, the reference capacitor is formed of a reference capacitor first electrode, a reference capacitor dielectric layer and a reference capacitor second electrode, the signal amplification element is formed of a MIS type thin film semiconductor device for signal amplification, including a gate electrode, a gate insulating layer and a semiconductor layer, and a part of the drain region and a part of the gate electrode of the MIS type thin film semiconductor device for signal amplification form an overlapped portion via a gate insulating layer, and the overlapped portion forms a reference capacitor. Specifically, the drain region side of semiconductor layer including a donor type or acceptor type impurity in the semiconductor layer forming a MIS type thin film semiconductor device for signal amplification becomes a reference capacitor first electrode, which is directly or indirectly coupled with the individual power supply lines. The gate electrode of the MIS type thin film semiconductor device for signal amplification is a common electrode with the reference capacitor second electrode, and coupled to the capacitance detecting electrode. The source region of the MIS type thin film semiconductor device for signal amplification is directly or indirectly coupled to the individual output lines.

In the invention, using a gate electrode length, which is an overlapped portion of the gate electrode of the MIS type thin film semiconductor device for signal amplification and the semiconductor layer drain region, $L_1$ ($\mu m$), a gate electrode length, which is an overlapped portion of the gate electrode of the MIS type thin film semiconductor device for signal amplification and the semiconductor layer channel forming region, $L_2$ ($\mu m$), a width of the gate electrode of $W$ ($\mu m$), a thickness of the gate insulating layer of $t_{ox}$ ($\mu m$), a dielectric constant of the gate insulating layer of $\epsilon_{ox}$, the capacitance $C_R$ of the reference capacitor and the transistor capacitance of $C_T$ of the MIS type thin film semiconductor device for signal amplification are defined as $$C_R = \epsilon_0 \cdot \epsilon_{ox} \cdot L_1 \cdot W / t_{ox},$$

$$C_T = \epsilon_0 \cdot \epsilon_{ox} \cdot L_2 \cdot W / t_{ox}$$

where $\epsilon_0$ is the permittivity in vacuum, respectively, and using an area of the capacitance detecting electrode of $S_D$ ($\mu m^2$), a thickness of the capacitance detecting dielectric layer of $t_D$ (μm), a dielectric constant of the capacitance detecting dielectric layer of $\in_D$, the element capacitance $C_D$ of the signal detection element is defined as $$C_D = \in_0 \cdot \in_D \cdot S_D / t_D$$

where $\in_0$ is the permittivity in vacuum, and the element capacitance $C_D$ is sufficiently larger than $C_R + C_T$, a summation of the capacitance $C_R$ of the reference capacitor and the transistor capacitance $C_T$. Sufficiently large generally means a difference of approximately ten times or more, therefore, in other words, the element capacitance $C_D$ satisfies a relation of $$C_D > 10 \times (C_R + C_T),$$

whereas $C_R + C_T$ is a summation of the capacitance $C_R$ of the reference capacitor and the transistor capacitance $C_T$. In the electrostatic capacitance detection device according to the invention, the capacitance detecting dielectric layer is preferably located on the uppermost surface of the electrostatic capacitance detection device. When the object is apart from the capacitance detecting dielectric layer with an object distance of $t_A$ without contacting the capacitance detecting dielectric layer, the capacitance $C_A$ of the object is defined as $$C_A = \in_0 \cdot \in_A \cdot S_D / t_A$$

using the permittivity in vacuum of $\in_0$, a dielectric constant of air of $\in_A$, and an area of the capacitance detecting electrode of $S_D$, then the electrostatic capacitance detection device is configured so that $C_R + C_T$, a summation of the capacitance $C_R$ of the reference capacitor and the transistor capacitance $C_T$, is sufficiently larger than the capacitance $C_A$ of the object. As described above, if a difference of approximately ten times or more is recognized, it can mean sufficiently large, therefore, $C_R + C_T$, a summation of the capacitance $C_R$ of the reference capacitor and the transistor capacitance $C_T$, and the capacitance $C_A$ of the object satisfy a relation of $$(C_R + C_T) > 10 \times C_A.$$

More ideally, the capacitance detecting dielectric layer is located on the uppermost surface of the electrostatic capacitance detection device, and using a gate electrode length, which is an overlapped portion of the gate electrode of the MIS type thin film semiconductor device for signal amplification and the semiconductor layer drain region, $L_1$ (μm), a gate electrode length, which is an overlapped portion of the gate electrode of the MIS type thin film semiconductor device for signal amplification and the semiconductor layer channel forming region, $L_2$ (μm), a width of the gate electrode of W (μm), a thickness of the gate insulating layer of $t_{ox}$ (μm), a dielectric constant of the gate insulating layer of $\in_{ox}$, the capacitance $C_R$ of the reference capacitor and the transistor capacitance of $C_T$ are defined as $$C_R = \in_0 \cdot \in_{ox} \cdot L_1 \cdot W / t_{ox},$$

$$C_T = \in_0 \cdot \in_{ox} \cdot L_2 \cdot W / t_{ox}$$

where $\in_0$ is the permittivity in vacuum, respectively, and using an area of the capacitance detecting electrode of $S_D$ (μm²), a thickness of the capacitance detecting dielectric layer of $t_D$ (μm), a dielectric constant of the capacitance detecting dielectric layer of $\in_D$, the element capacitance $C_D$ of the signal detection element is defined as $$C_D = \in_0 \cdot \in_D \cdot S_D / t_D$$

where $\in_0$ is the permittivity in vacuum, and the element capacitance $C_D$ is sufficiently larger than $C_R + C_T$, a summation of the capacitance $C_R$ of the reference capacitor and the transistor capacitance $C_T$, and when the object is apart from the capacitance detecting dielectric layer with an object distance of $t_A$ without contacting the capacitance detecting dielectric layer, the capacitance $C_A$ of the object is defined as $$C_A = \in_0 \cdot \in_A \cdot S_D / t_A$$

using the permittivity in vacuum of $\in_0$, a dielectric constant of air of $\in_A$, and an area of the capacitance detecting electrode of $S_D$, then the electrostatic capacitance detection device is configured so that $C_R + C_T$, a summation of the capacitance $C_R$ of the reference capacitor and the transistor capacitance $C_T$, is sufficiently larger than the capacitance $C_A$ of the object. More specifically, the electrostatic capacitance detection device is configured so that the element capacitance $C_D$, $C_R + C_T$, a summation of the capacitance $C_R$ of the reference capacitor and the transistor capacitance $C_T$, and the capacitance $C_A$ of the object satisfy a relation of $$C_D > 10 \times (C_R + C_T) > 100 \times C_A.$$

The invention is an electrostatic capacitance detection device for reading surface contours of an object by detecting an electrostatic capacitance, which changes according to the distance from the object. The electrostatic capacitance detection device is formed of M individual power supply lines and N individual output lines, arranged in a matrix of M rows×N columns, electrostatic capacitance detection elements provided on the crossing points of the individual power supply lines and the individual output lines, and furthermore, a power supply selecting circuit coupled to the M individual power supply lines. Each of the electrostatic capacitance detection elements can be formed of a capacitance detecting electrode, a capacitance detecting dielectric layer, a reference capacitor and a signal amplification element, the reference capacitor is formed of a reference capacitor first electrode, a reference capacitor dielectric layer and a reference capacitor second electrode, the signal amplification element is formed of a MIS type thin film semiconductor device for signal amplification, including a gate electrode, a gate insulating layer and a semiconductor layer. In this case, a source region of the MIS type thin film semiconductor device for signal amplification element is directly or indirectly coupled to each of the individual output lines, a drain region of the MIS type thin film semiconductor device for signal amplification element is connected to each of the individual power supply lines and the reference capacitor first electrode, and a gate electrode of the MIS type thin film semiconductor device for signal amplification element is connected to the capacitance detecting electrode and the reference capacitor second electrode. In the electrostatic capacitance detection device according to the invention, the individual output lines are wired by the first wiring, the individual power supply lines are wired by the second wiring, the capacitance detecting electrode is wired by the third wiring, and the first, second, and third wirings are electrically insulated via the insulating layers.

The invention is an electrostatic capacitance detection device for reading surface contours of an object by detecting an electrostatic capacitance, which changes according to the distance from the object. The electrostatic capacitance detection device is formed of M individual power supply lines and N individual output lines, arranged in a matrix of M rows×N columns, electrostatic capacitance detection elements provided on the crossing points of the individual power supply lines and the individual output lines, and furthermore, an output signal selecting circuit coupled to the N individual output lines. Each of the electrostatic capacitance detection elements is formed of a capacitance detecting electrode, a capacitance detecting dielectric layer, a reference capacitor and a signal amplification element, the output signal selecting circuit is formed of a common output line and a path gate for output signal, the reference capacitor is formed of a reference capacitor first electrode, a reference capacitor dielectric layer and a reference capacitor second electrode, the signal amplification element is formed of a MIS type thin film semiconductor device for signal amplification, including a gate electrode, a gate insulating layer and a semiconductor layer, the path gate for output signal is formed of a MIS type thin film semiconductor device for output signal path gate, including a gate electrode, a gate insulating layer and a semiconductor layer.

In this case, a source region of the MIS type thin film semiconductor device for signal amplification element is directly or indirectly coupled to each of the individual output lines, a drain region of the MIS type thin film semiconductor device for signal amplification element is connected to each of the individual power supply lines and the reference capacitor first electrode, a gate electrode of the MIS type thin film semiconductor device for signal amplification element is connected to the capacitance detecting electrode and the reference capacitor second electrode, a source region of the MIS type thin film semiconductor device for output signal path gate is connected to the common output line, and a drain region of the MIS type thin film semiconductor device for output signal path gate is also coupled to each of the individual output line. Furthermore, a gate electrode of the MIS type thin film semiconductor device for output signal path gate is connected to an output line for output selection, which supplies a signal for selecting what individual output line is selected among N individual output lines. In the electrostatic capacitance detection device according to the present invention, the individual output lines and the common output line are wired by the first wiring, the individual power supply lines and the output line for output selection are wired by the second wiring, the capacitance detecting electrode is wired by the third wiring, and the first, second, and third wirings are electrically insulated via the insulating layers.

The invention is an electrostatic capacitance detection device for reading surface contours of an object by detecting an electrostatic capacitance, which changes according to the distance from the object. The electrostatic capacitance detection device can be formed of M individual power supply lines and N individual output lines, arranged in a matrix of M rows×N columns, electrostatic capacitance detection elements provided on the crossing points of the individual power supply lines and the individual output lines, and furthermore, a power supply selecting circuit coupled to the M individual power supply lines, and an output signal selecting circuit coupled to the N individual output lines. Each of the electrostatic capacitance detection elements is formed of a capacitance detecting electrode, a capacitance detecting dielectric layer, a reference capacitor and a signal amplification element, the output signal selecting circuit is formed of a common output line and a path gate for output signal, the reference capacitor is formed of a reference capacitor first electrode, a reference capacitor dielectric layer and a reference capacitor second electrode, the signal amplification element is formed of a MIS type thin film semiconductor device for signal amplification, including a gate electrode, a gate insulating layer and a semiconductor layer, the path gate for output signal is formed of a MIS type thin film semiconductor device for output signal path gate, including a gate electrode, a gate insulating layer and a semiconductor layer.

In this case, a source region of the MIS type thin film semiconductor device for signal amplification element is directly or indirectly coupled to each of the individual output lines, a drain region of the MIS type thin film semiconductor device for signal amplification element is connected to each of the individual power supply lines and the reference capacitor first electrode, a gate electrode of the MIS type thin film semiconductor device for signal amplification element is connected to the capacitance detecting electrode and the reference capacitor second electrode, a source region of the MIS type thin film semiconductor device for output signal path gate is connected to the common output line, and a drain region of the MIS type thin film semiconductor device for output signal path gate is connected to each of the individual output lines. Furthermore, a gate electrode of the MIS type thin film semiconductor device for output signal path gate is connected to an output line for output selection, which supplies a signal for selecting what individual output line is selected among N individual output lines. In the electrostatic capacitance detection device according to the invention, the individual output lines and the common output line are wired by the first wiring, the individual power supply lines and the output line for output selection are wired by the second wiring, the capacitance detecting electrode is wired by the third wiring, and the first, second, and third wirings are electrically insulated via the insulating layers.

A conventional technology using a single crystal silicon substrate (single crystal silicon sensor) can only form a small electrostatic capacitance detection device in a square shape of approximately having a few millimeter in each side on a plastic substrate, however, an electrostatic capacitance detection device having the same performance as the conventional single crystal silicon sensor can be realized with a thin film semiconductor device according to the present invention. Furthermore, a sensor area of the electrostatic capacitance detection device can be also increased to approximately 100 times easily, and additionally, this excellent electrostatic capacitance detection device can be formed on a plastic substrate. In addition, the indentation information of an object can be detected with significant high precision. As a result, when this electrostatic capacitance detection device is mounted, for example, on a smart card, an effect of remarkably enhanced security level for the card can be recognized. Furthermore, the conventional electrostatic capacitance detection device, using the single crystal silicon substrate, utilizes only a part of the electrostatic capacitance detection device for the single crystal silicon semiconductor, resulting in spending a lot energy and labor in waste. On the other hand, the invention eliminates the above described waste, and has an effect that is useful in preserving the global environment.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

The invention manufactures an electrostatic capacitance detection device for reading surface contours of an object by detecting an electrostatic capacitance, which changes according to the distance with the object with a metal-insulator-semiconductor (MIS) type thin film semiconductor. Because the thin film semiconductor device is usually manufactured on a glass substrate, it is known as a technology, which inexpensively manufactures semiconductor integrated circuits requiring a large area and is specifically applied to liquid crystal display devices. Therefore, when the electrostatic capacitance detection device, which is applied to a finger print sensor or the like, is manufactured by the thin film semiconductor device, it is unnecessary to use an expensive substrate, such as a single crystal silicon substrate, which is manufactured by consuming large amount of energy, thereby capable of inexpensively manufacturing the device without consuming precious resources on the earth. Furthermore, as for the thin film semiconductor device, a semiconductor integrated circuit can be manufactured on a plastic substrate by using a transfer technology called as the SUFTLA (Japanese laid-open patent publication No. 11-312811 or S. Utsunomiya et. al. Society for Information Display p. 916 (2000)), therefore, the electrostatic capacitance detection device can be formed on the plastic substrate without using the single crystal silicon substrate.

Figure 1:
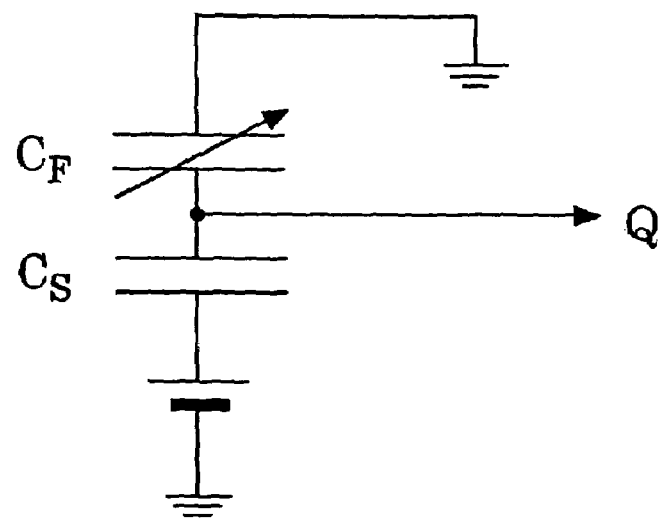
FIG. 1 is a diagram explaining an operating principle in the conventional art.

A current technology for the thin film semiconductor device cannot manufacture the electrostatic capacitance detection device applying the conventional operating principle shown in FIG. 1. Because an electric charge Q induced between the two capacitors coupled in series is so small, the electric charge Q can be accurately read by using a single crystal silicon LSI technology, which allows a high precision detection, however, the transistor characteristic of the thin film semiconductor device is not so excellent as that of the single crystal silicon LSI technology and the characteristic deviation among thin film semiconductor devices is so large, therefore, the electric charge Q cannot be accurately read. Thus, the electrostatic capacitance detection device according to the invention is formed of M (M is an integer of one or more) individual power supply lines and N (N is an integer of one or more) individual output lines, arranged in a matrix of M rows×N columns, and electrostatic capacitance detection elements provided on the crossing points of the individual power supply lines and the individual output lines, wherein each of the electrostatic capacitance detection elements is formed of a signal detection element and a signal amplification element. The signal detection element can be formed of a capacitance detecting electrode, a capacitance detecting dielectric layer and a reference capacitor, and the electric charge Q is generated on the capacitance detecting electrode depending on the electrostatic capacitance. In the present invention, the electric charge Q is amplified and converted into current by the signal amplification element provided on each of the electrostatic capacitance detection elements. Specifically, the signal amplification element is formed of a MIS type thin film semiconductor device for signal amplification, including a gate electrode, a gate insulating layer and a semiconductor layer, wherein the gate electrode of the MIS type thin film semiconductor device for signal amplification is connected to the capacitance detecting electrode and either one of the electrodes of the reference capacitor (for example, the second electrode).

Figure 2:
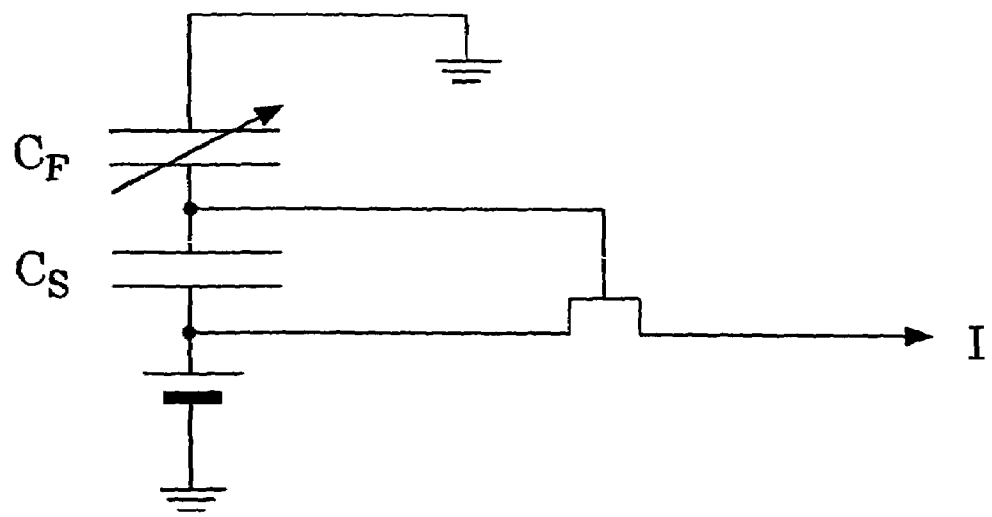
FIG. 2 is a diagram explaining an operating principle in the present invention.

FIG. 2 shows an operating principle of the invention. Electric charges, which are generated between a capacitor having the electrostatic capacitance $C_S$ and a capacitor having the electrostatic capacitance $C_F$ that changes depending on surface contours of the object, change a gate voltage of the MIS type thin film semiconductor device for signal amplification. When a predetermined voltage is applied on the drain region of the thin film semiconductor device, a current I, flowing between the source and drain of the thin film semiconductor device, is significantly amplified depending on the induced electric charges Q. The induced electric charges Q are preserved without flowing to anywhere, therefore, the current I can be easily measured by increasing the drain voltage or extending the measuring time. Accordingly, the surface shape of the object can be measured with sufficient accuracy even using the thin film semiconductor device.

Figure 3:
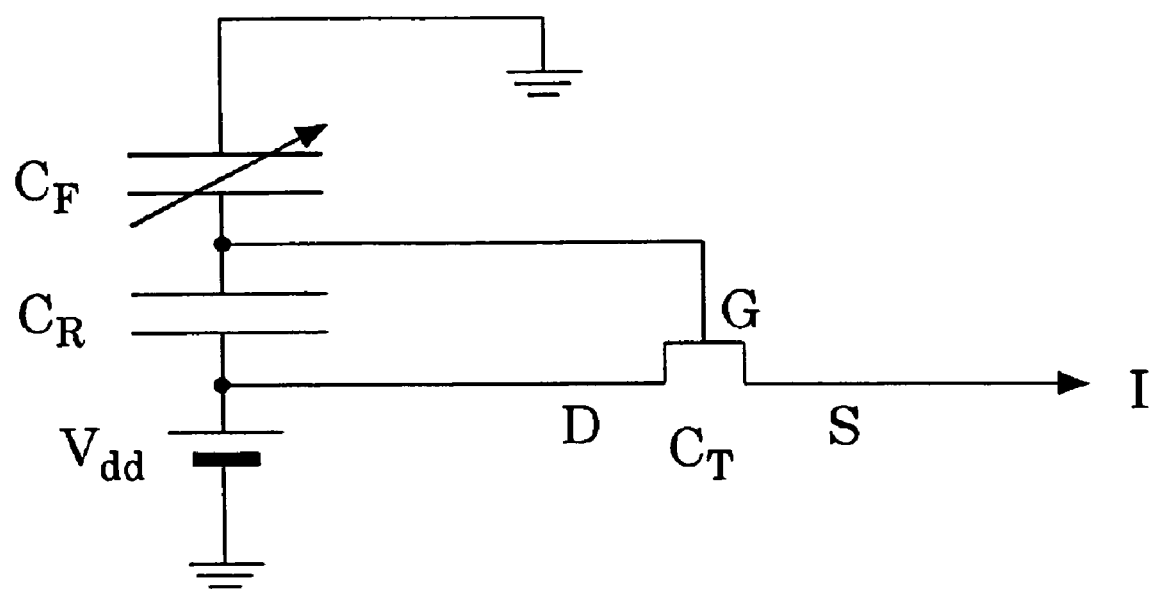
FIG. 3 is a diagram explaining an operating principle in the present invention.

As described above, in the invention, the MIS type thin film semiconductor device for signal amplification is used as the signal amplification element. In this case, the MIS type thin film semiconductor device for signal amplification is also used as a capacitor having the electrostatic capacitance $C_S$, and furthermore, a reference capacitor is provided to increase an electrostatic capacitance and enhance detecting sensitivity. In other words, in place of the electrostatic capacitance $C_S$, a new electrostatic capacitance is to be a summation of the transistor capacitance $C_T$ of the MIS type thin film semiconductor device for signal amplification and the capacitance $C_R$ of the reference capacitor, which is for increasing an electrostatic capacitance. This allows the adjustment of electric capacitance, and furthermore, the simplification of the structure and the manufacturing process. Furthermore, a high speed detecting operation can be realized by reducing a length of the semiconductor channel forming region. In addition, it is effective to combine the two power supply lines shown in FIG. 2 as a common power supply $V_{dd}$, because the redundant wirings in the electrostatic capacitance detection device can be omitted. FIG. 3 shows an equivalent circuit diagram relating to the operating principle in such a state. A capacitor having the electrostatic capacitance $C_F$ changing depending on surface contours of the object and a capacitor having the transistor capacitance $C_T$ are coupled in series, and at the same time, the capacitor having the electrostatic capacitance $C_F$ and a capacitor having the capacitance $C_R$ of the reference capacitor are coupled in series. Strictly speaking, the transistor capacitance $C_T$ is the electrostatic capacitance, formed between the drain electrode and the gate electrode of the MIS type thin film semiconductor device for signal amplification. In order to realize the configuration shown in FIG. 3, the source region of the MIS type thin film semiconductor device for signal amplification is connected to each of the individual output lines, the drain region of the MIS type thin film semiconductor device for signal amplification is connected to each of the individual power supply lines and the reference capacitor first electrode, and furthermore, the gate electrode of the MIS type thin film semiconductor device for signal amplification and the reference capacitor second electrode are coupled, then a voltage $V_{dd}$ is applied on the individual power supply lines and the current I, changing depending on the surface contours of the object, is outputted from the individual output lines.

A structure of the electrostatic capacitance detection element realizing the invention is described with reference to FIG. 4. As for the MIS type thin film semiconductor device for signal amplification forming a signal amplification element of the electrostatic capacitance detection element, the essential requirements are a semiconductor layer including a source region, a channel forming region and a drain region, and a gate insulating layer and a gate electrode. A donor type or acceptor type impurity is doped into the semiconductor layer in the source region and the drain region, then an N type or P type semiconductor is formed. The gate electrode overlaps over the semiconductor layer drain region via the gate insulating layer, and a portion overlapped in this way becomes a reference capacitor. The reference capacitor is formed of a reference capacitor first electrode, a reference capacitor dielectric layer, and a reference capacitor second electrode.

Figure 4A:
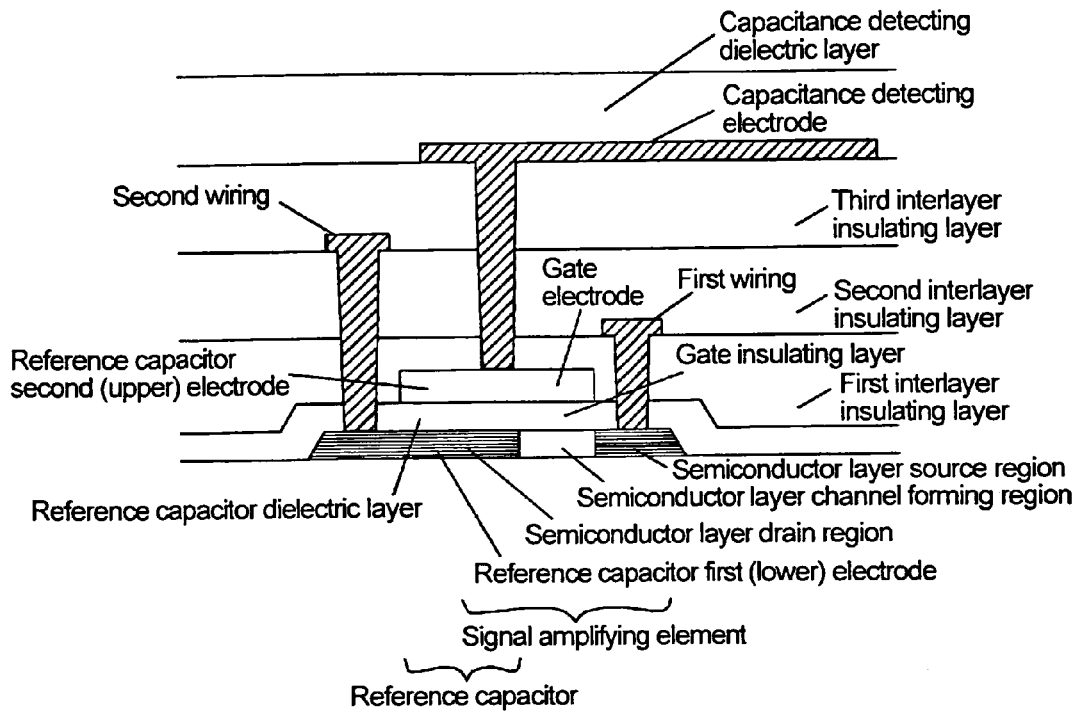
FIG. 4A is a diagram explaining an element structure according to the present invention.

As shown in FIG. 4(A), the first electrode becomes a common electrode with the drain region as a lower electrode, and the second electrode becomes a common electrode with the gate electrode as an upper electrode, however, either the first electrode or the second electrode may become the upper electrode. When a bottom gate type transistor, in which the gate electrode is located in a lower position with respect to the semiconductor layer, is used as the MIS thin film semiconductor device for signal amplification, the reference capacitor lower electrode becomes a common electrode with the gate electrode, and the drain region becomes a common electrode with the reference capacitor upper electrode, thereby to simplify the structure. The reference capacitor first electrode and the semiconductor layer drain region are formed with a same layer (semiconductor layer in which a impurity is doped) on the same layer (base protecting layer), and the reference capacitor second electrode and the gate electrode are also formed with a same layer (metallic layer) on a same layer (gate insulating layer). The gate electrode of the MIS thin film semiconductor device for signal amplification is connected to the capacitance detecting electrode, which is covered with a capacitance detecting dielectric layer. Thus, the semiconductor layer drain region and the reference capacitor first electrode have a same potential, and the gate electrode of the MIS thin film semiconductor device for signal amplification and the reference capacitor second electrode have a same potential and are coupled to the capacitance detecting electrode, thereby realizing the equivalent circuit shown in FIG. 3.

As for the configuration shown in FIG. 4(A), the reference capacitor and the signal amplification element are arranged to be overlapped with each other, thereby enhancing space-use efficiency, and realizing an electrostatic capacitance detection device having high sensitivity. Furthermore, prior to forming the gate electrode, the reference capacitor lower electrode and the drain region are formed, and after forming the gate electrode, the source region is formed by the self-alignment method (the source region is formed by ion implanting using the gate electrode as a mask), therefore, there is an effect that the channel forming region can be made smaller than the resolution level that a exposure device has. In general, the resolution of an exposure device is inferior to the alignment accuracy of the exposure device. For this reason, in the configuration of the invention, the channel forming region length is formed using the alignment precision of the exposure device, not the resolution of the exposure device, therefore, the size of the channel forming region length can be fined to the level of alignment precision, thereby realizing a high speed operation of the electrostatic capacitance detecting circuit.

In FIG. 4(A), the MIS thin film semiconductor device for signal amplification is covered with a first interlayer insulating layer. A first wiring is connected to the source region of the MIS thin film semiconductor device for signal amplification, and a second wiring is connected to the drain region of the MIS thin film semiconductor device for signal amplification. The individual output lines are formed by the first wiring and the individual power supply lines are formed by the second wiring. A second interlayer insulating layer is provided between the first wiring and the second wiring, and electrically insulates the first wiring and the second wiring. The capacitance detecting electrode, forming the signal detection element of each of the electrostatic capacitance detection elements, is connected to the gate electrode of the MIS thin film semiconductor device for signal amplification, and formed on a third interlayer insulating layer. The capacitance detecting electrode is wired by the third wiring. Between the second wiring and the third wiring, the third interlayer insulating layer is provided, and electrically insulates the second wiring and the third wiring. A parasitic capacitance, generated between the first wiring and the capacitance detecting electrode, can be minimized by wiring the capacitance detecting electrode with the third wiring, and a small amount of electrostatic capacitance can be detected with high sensitivity by minimizing the dielectric constant of the second interlayer insulating layer and the dielectric constant of the third interlayer insulating layer as much as possible. The capacitance detecting dielectric layer covers on the capacitance detecting electrode, and is located on the uppermost surface of the electrostatic capacitance detection device. The capacitance detecting dielectric layer also plays a role of protective layer for the electrostatic capacitance detection device.

Figure 4B:
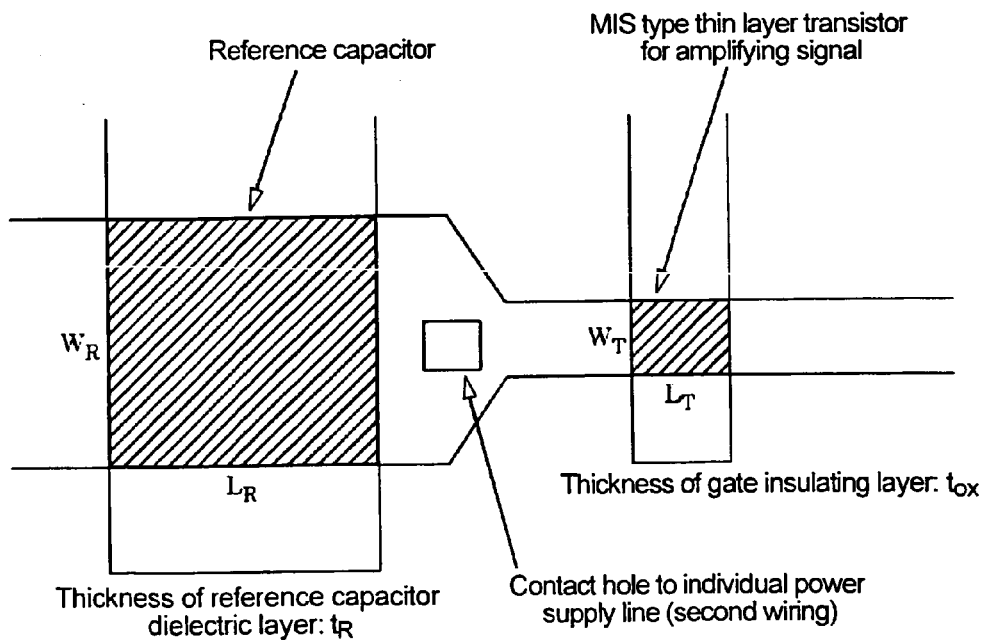
FIG. 4B is a diagram explaining an element structure according to the present invention.

As for the example shown in FIG. 4(A), the overlapped portion of the gate electrode and the drain electrode of the signal amplification element is the reference capacitor, however, the reference capacitor and the MIS thin layer transistor for amplifying signal may be separated from each other, as shown in FIG. 4(B). The reference capacitor and the thin layer transistor for amplifying signal are coupled via a conductive material, such as a doped semiconductor layer. The transistor for amplifying signal is preferably as small as possible in order to operate with a high speed. On the other hand, there exists an optimum capacitance value for a summation of the capacitance $C_R$ of the reference capacitor and the transistor capacitance $C_T$ depending on the to-be-detected object. As for the configuration shown in FIG. 4(B), the transistor can be made smaller, and at the same time the value of $C_R+C_T$ can be optimized, therefore, the sensitivity of the electrostatic capacitance detection device according to the present invention can be enhanced. A portion for a contact hole, conducting the individual power supply lines (second wiring) and the drain region, is preferably provided between the reference capacitor and the MIS type thin layer transistor for amplifying signal.

Figure 5A:
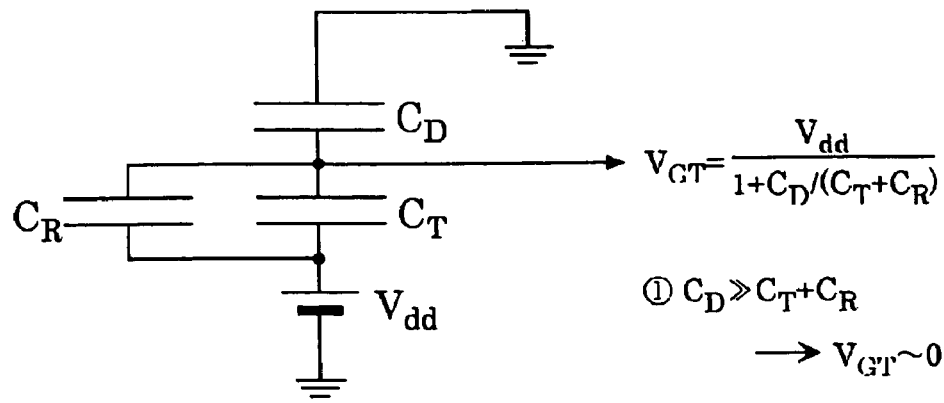
FIG. 5 is a diagram explaining a principle of the present invention.

As for the above configuration, in order that the MIS type thin film semiconductor device for signal amplification according to the invention effectively conduct a function of the signal amplification, the transistor capacitance $C_T$ of the MIS type thin film semiconductor device for signal amplification, the capacitance $C_R$ of the reference capacitor, and the element capacitance $C_D$ of the signal detection element have to be adequately determined. Next, a relation between these will be described with reference to FIG. 5.

At first, assume a situation that a protrusion portion of to-be-measured object contacts the capacitance detecting dielectric layer, and the object is electrically grounded. Specifically, assume a situation that the electrostatic capacitance detection device is used as a finger print sensor, and a ridge of a fingerprint contact on the surface of the capacitance detecting dielectric layer. By using an area of the reference capacitor electrode of $S_R$ (µm²), a length of the reference capacitor electrode of $L_R$ (µm), a width of the reference capacitor electrode of $W_R$ (µm), an area of the gate electrode of $S_T$ (µm²), a length of the gate electrode of $L_T$ (µm), and a width of the gate electrode of $W_T$ (µm) of the MIS type thin film semiconductor device for signal amplification, a thickness of the reference capacitor dielectric layer of $t_R$ (µm), a dielectric constant of the reference capacitor dielectric layer of $\in_R$, a thickness of the gate insulating layer of $t_{ox}$ (µm), and a dielectric constant of the gate insulating layer of $\in_{ox}$, the capacitance $C_R$ of the reference capacitor and the transistor capacitance $C_T$ of the MIS type thin film semiconductor device for signal amplification are defined as $C_R = \in_0 \cdot \in_R \cdot S_R / t_R = \in_0 \cdot \in_R \cdot L_R \cdot W_R / t_R$, $C_T = \in_0 \cdot \in_{ox} \cdot S_T / t_{ox} = \in_0 \cdot \in_{ox} \cdot L_T \cdot W_T / t_{ox}$ where $\in_0$ is the permittivity in vacuum, respectively. When the reference capacitor and the signal amplification element shown in FIG. 4(A) are integrally formed, using a length of the gate electrode, which is an overlapped portion of the gate electrode of the MIS type thin film semiconductor device for signal amplification and a drain region of the semiconductor film, $L_1$ (µm), a length of the gate electrode, which is an overlapped portion of the gate electrode of the MIS type thin film semiconductor device for signal amplification and a semiconductor layer channel forming region, $L_2$ (µm), a width of the gate electrode of W (µm), a thickness of the gate insulating layer of $t_{ox}$ (µm), a dielectric constant of the gate insulating layer of $\in_{ox}$, the capacitance $C_R$ of the reference capacitor and the transistor capacitance $C_T$ of the MIS type thin film semiconductor device for signal amplification are defined as $C_R = \in_0 \cdot \in_R \cdot S_R / t_R = \in_0 \cdot \in_{ox} \cdot L_1 \cdot W / t_{ox}$, $C_T = \in_0 \cdot \in_{ox} \cdot S_T / t_{ox} = \in_0 \cdot \in_{ox} \cdot L_2 \cdot W / t_{ox}$ where $\in_0$ is the permittivity in vacuum, respectively. Furthermore, using an area of the capacitance detecting electrode of $S_D$ (µm²), a thickness of the capacitance detecting dielectric layer of $t_D$ (µm), and a dielectric constant of the signal detection element of $\in_D$, the element capacitance $C_D$ of the signal detection element is defined as $C_D = \in_0 \cdot \in_D \cdot S_D / t_D$ where $\in_0$ is the permittivity in vacuum. The surface of object becomes a ground electrode for the element capacitance $C_D$, and the capacitance detecting electrode is equivalent to the other electrode by interposing the capacitance detecting dielectric layer. Because the capacitance detecting electrode is connected to the gate electrode of the MIS type thin film semiconductor device for signal amplification and the reference capacitor second electrode, a capacitor having the element capacitance $C_D$ and a capacitor having the transistor capacitance $C_T$ are coupled in series, and at the same time, the capacitor having the element capacitance $C_D$ and a capacitor having the capacitance $C_R$ of the reference capacitor are coupled in series. A voltage $V_{dd}$ is applied to the two capacitors coupled in series (FIG. 5(A)). Because the applied voltage is divided depending on the electrostatic capacitance, a voltage $V_{GT}$, which is applied on the gate electrode of the MIS type thin film semiconductor device for signal amplification in this state, becomes as follows;

$$V_{GT} = \frac{V_{dd}}{1 + \frac{C_D}{(C_R + C_T)}}$$

Therefore, when the element capacitance $C_D$ is sufficiently larger than $C_R + C_T$, a summation of the capacitance $C_R$ of the reference capacitor and the transistor capacitance $C_T$, $C_D \gg (C_R + C_T)$ the gate voltage is approximated as $V_{GT} \approx 0$ and the voltage is rarely applied to the gate electrode.

As a result, the MIS type thin film semiconductor device for signal amplification is in OFF state, and the current I becomes very small. After all, in order that the signal amplification element rarely flows current when a protrusion portion of the object corresponding to a ridge of a fingerprint contacts the electrostatic capacitance detection device, it is necessary to adjust a gate electrode area, a gate electrode length, a width of the gate electrode, a material of the gate insulating layer, a thickness of the gate insulating layer, an area of the reference capacitor electrode, a length of the reference capacitor electrode, a width of the reference capacitor electrode, a material of the reference capacitor dielectric layer, a thickness of the reference capacitor dielectric layer, an area of capacitance detecting electrode, a material of the capacitance detecting dielectric layer and a thickness of the capacitance detecting dielectric layer or the like, which form the electrostatic capacitance detection device, so that the element capacitance $C_D$ is sufficiently larger than $C_R + C_T$, a summation of the capacitance $C_R$ of the reference capacitor and the transistor capacitance $C_T$. Sufficiently large generally means a difference of approximately ten times. In other words, it is satisfactory when the element capacitance $C_D$ satisfies a relation of $C_D > 10 \times (C_R + C_T)$, whereas $C_R + C_T$ is a summation of the capacitance $C_R$ of the reference capacitor and the transistor capacitance $C_T$. In this case, a ratio of $V_{GT}/V_{dd}$ becomes less than approximately 0.1 and the thin film semiconductor device cannot be in ON state. In order to reliably detect the protrusion portion of the object, it is important that the MIS type thin film semiconductor device for signal amplification is in OFF state when the protrusion portion of the object contacts the electrostatic capacitance detection device. Therefore, when a positive power supply is used for the power supply voltage $V_{dd}$, an enhancement type (normally off type) N type transistor, in which a drain current does not flow when the gate voltage is nearly zero, is preferably used as the MIS type thin film semiconductor device for signal amplification. More ideally, an N type MIS type thin film semiconductor device for signal amplification, which satisfies a relation of $$0 < 0.1 \times V_{dd} < V_{min},$$

$$0 < \frac{V_{dd}}{1 + \frac{C_D}{(C_R + C_T)}} < V_{min}$$

whereas the $V_{min}$ is a gate voltage (minimum gate voltage), at which the drain current in transfer characteristic becomes the minimum, is used.

On the other hand, when a negative power supply is used for the power supply voltage $V_{dd}$, an enhancement type (normally off type) P type transistor, in which a drain current does not flow when the gate voltage is nearly zero, is used as the MIS type thin film semiconductor device for signal amplification. Ideally, a P type MIS type thin film semiconductor device for signal amplification, which satisfies a relation of $$V_{min} < 0.1 \times V_{dd} < 0,$$

$$V_{min} < \frac{V_{dd}}{1 + \frac{C_D}{(C_R + C_T)}} < 0$$

whereas the $V_{min}$ is a minimum gate voltage of the P type MIS type thin film semiconductor device for signal amplification, is used.

This allows the protrusion portion of object to be reliably detected in a state that the current I is in very small.

Figure 5B:
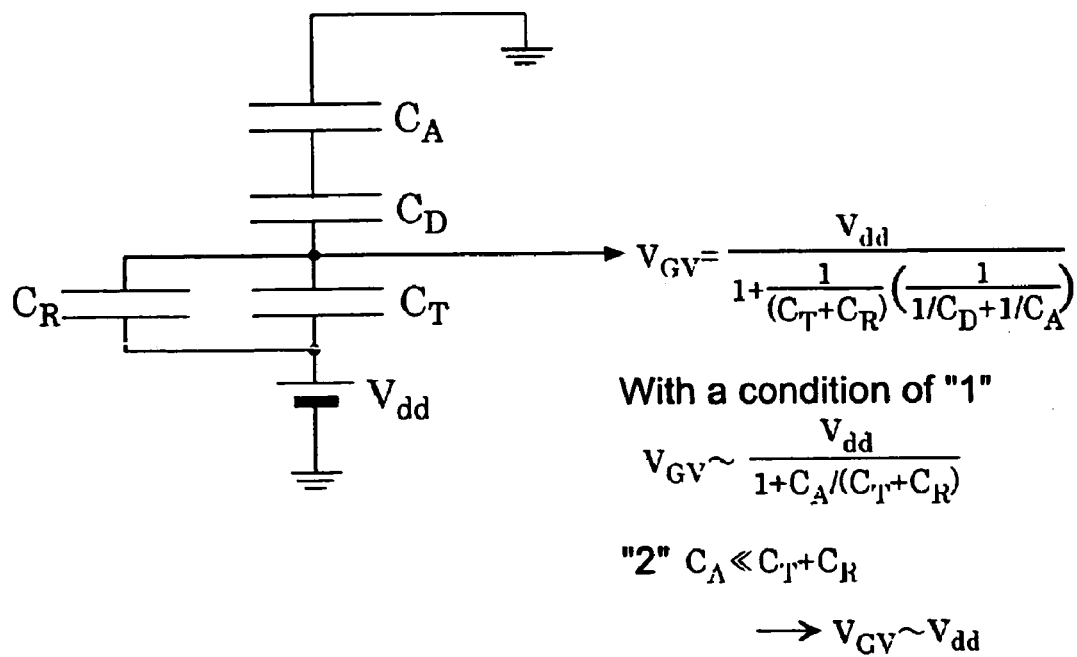

Next, assume a situation that the object does not contact the capacitance detecting dielectric layer and is apart from the capacitance detecting dielectric layer with an object distance of $t_A$. In other words, a protrusion portion of the to-be-measured object is above the capacitance detecting dielectric layer, and the object is electrically grounded. Specifically, when the electrostatic capacitance detection device is used as a fingerprint sensor, assume detecting a state that a valley of a fingerprint is above the surface of the electrostatic capacitance detection device. As described above, it is preferable for the electrostatic capacitance detection device according to the present invention that the capacitance detecting dielectric layer is located at the uppermost surface of the electrostatic capacitance detection device. FIG. 5(B) shows an equivalent circuit diagram at this time. Because the surface of the object does not contact the capacitance detecting dielectric layer, a new capacitor, using air as a dielectric substance, is formed between the capacitance detecting dielectric layer and the surface of the object. This is called as the capacitance $C_A$ of the object, defined as $$C_A = \epsilon_0 \cdot \epsilon_A \cdot S_D/t_A,$$

using the permittivity in vacuum of $\epsilon_0$, a dielectric constant of air of $\epsilon_A$, and an area of capacitance detecting electrode of $S_D$. Thus, in the state that the object is apart from the capacitance detecting dielectric layer, the transistor capacitance $C_T$ and the capacitance $C_R$ of the reference capacitor are coupled in parallel, the capacitors having the capacitance of ($C_R+C_T$), the element capacitance $C_D$, and the capacitance $C_A$ of the object are coupled in series, and the voltage $V_{dd}$ is applied on the capacitors (FIG. 5B). Because the applied voltage is divided into these capacitors depending on the electrostatic capacities, a voltage $V_{GV}$, which is applied on the gate electrode of the MIS type thin film semiconductor device for signal amplification in this state becomes as follows.

$$V_{GV} = \frac{V_{dd}}{1 + \frac{1}{(C_R + C_T)} \cdot \left(\frac{1}{\frac{1}{C_D} + \frac{1}{C_A}}\right)}$$

On the other hand, in the present invention, each of the electrostatic capacitance detection elements is made so as to satisfy the condition of $$C_D >> (C_R + C_T)$$

so that the drain current becomes significantly small when the object contacts the electrostatic capacitance detection device. Therefore, the $V_{GV}$ is further approximated to $$V_{GV} \approx \frac{V_{dd}}{1 + \frac{C_A}{(C_R + C_T)}}.$$

After all, when $C_R+C_T$, a summation of the capacitance $C_R$ of the reference capacitor and the transistor capacitance $C_T$, is sufficiently larger than the capacitance $C_A$ of the object, $$(C_R+C_T) >> C_A$$

the gate voltage $V_{GV}$ is as follows $$V_{GV} \approx V_{dd}$$

and can be substantially equal to the power supply voltage $V_{dd}$.

As a result, the MIS type thin film semiconductor device for signal amplification can be in ON state, and the current I becomes significantly large. In order that the signal amplification element flows a large current when a recessed portion of the object corresponding to a valley of a fingerprint is above the electrostatic capacitance detection device, it is necessary to configure an gate electrode area, a gate electrode length, a width of the gate electrode, a material of the gate insulating layer, a thickness of the gate insulating layer, an area of the reference capacitor electrode, a length of the reference capacitor electrode, a width of the reference capacitor electrode, a material of the reference capacitor dielectric layer, a thickness of the reference capacitor dielectric layer, an area of the capacitance detecting electrode, a material of the capacitance detecting dielectric layer, and a thickness of the capacitance detecting dielectric layer, or the like, which form the electrostatic capacitance detection device, so that $C_R+C_T$, a summation of the capacitance $C_R$ of the reference capacitor and the transistor capacitance $C_T$ is sufficiently larger than the capacitance $C_A$ of the object. As described above, sufficiently large means a difference of approximately ten times, therefore, it is satisfactory when $C_R+C_T$, a summation of the capacitance $C_R$ of the reference capacitor and the transistor capacitance $C_T$, and the capacitance $C_A$ of the object satisfy a relation of $$(C_R+C_T) > 10 \times C_A.$$

In this case, a ratio of $V_{GT}/V_{dd}$ becomes larger than approximately 0.91, and the semiconductor device can be easily in ON state. To reliably detect the recessed portion of the object, it is important that the MIS type thin film semiconductor device for signal amplification becomes ON state when the recessed portion of the object approaches to the electrostatic capacitance detection device. When a positive power supply is used for the power supply voltage $V_{dd}$, an enhancement type (normally off type) N type transistor is used as the MIS type thin film semiconductor device for signal amplification, and the threshold voltage $V_{th}$ of this transistor is preferably smaller than the $V_{GV}$.

$$0 < V_{th} < \frac{V_{dd}}{1 + \frac{1}{(C_R + C_T)} \cdot \left(\frac{1}{\frac{1}{C_D} + \frac{1}{C_A}}\right)}$$

$$0 < V_{th} < \frac{V_{dd}}{1 + \frac{C_A}{(C_R + C_T)}}$$

More ideally, an N type MIS type thin film semiconductor device for signal amplification, which satisfies a relation of $$0 < V_{th} < 0.91 \times V_{dd},$$

is used. On the other hand, when a negative power supply is used for the power supply voltage $V_{dd}$, an enhancement type (normally off type) P type transistor is used as the MIS type thin film semiconductor device for signal amplification, and ideally, the threshold voltage $V_{th}$ of the P type MIS type thin film semiconductor device for signal amplification is preferably larger than the $V_{GV}$. More ideally, an N type MIS type thin film semiconductor device for signal amplification, which satisfies a relation of $$\frac{V_{dd}}{1 + \frac{1}{(C_R + C_T)} \cdot \left(\frac{1}{\frac{1}{C_D} + \frac{1}{C_A}}\right)} < V_{th} < 0$$

$$\frac{V_{dd}}{1 + \frac{C_A}{(C_R + C_T)}} < V_{th} < 0,$$

is used. On the other hand, when a negative power supply is used for the power supply voltage $V_{dd}$, an enhancement type (normally off type) P type transistor is used as the MIS type thin film semiconductor device for signal amplification, and ideally, the threshold voltage $V_{th}$ of the P type MIS type thin film semiconductor device for signal amplification is preferably larger than the $V_{GV}$.

More ideally, a P type MIS type thin film semiconductor device for signal amplification, which satisfies a relation of $$0.91 \times V_{dd} < V_{th} < 0,$$

is used. This allows the recessed portion of the object to be detected securely in a state of the significant large current I.

After all, in order to accurately recognizes the indentation of the object by rarely flowing current in the signal amplification element when the protrusion portion of the object corresponding to a ridge of a fingerprint or the like contacts the electrostatic capacitance detection device, and at the same time, by flowing large current in the signal amplification element when the recessed portion of the object corresponding to a valley of a fingerprint or the like approaches the electrostatic capacitance detection device, it is necessary for the electrostatic capacitance detection element that the capacitance detecting dielectric layer is located on the uppermost of the electrostatic capacitance detection device, or to provide a conductive layer separated for each of the electrostatic capacitance detection elements on the capacitance detecting dielectric layer and to adjust a gate electrode area of $S_T$ (μm$^2$), a gate electrode length of $L_T$ (μm), and a width of the gate electrode of $W_T$ (μm) of the MIS type thin film semiconductor device for signal amplification, a thickness of the gate insulating layer of $t_{ox}$ (μm), a dielectric constant of the gate insulating layer of $\in_{ox}$, an area of the reference capacitor electrode of $S_R$ (μm$^2$), a length of the reference capacitor electrode of $L_R$ (μm), a width of the reference capacitor electrode of $W_R$ (μm), a thickness of the reference capacitor dielectric layer of $t_R$ (μm), a dielectric constant of the reference capacitor dielectric layer of $\in_R$, an area of the capacitance detecting electrode of $S_D$ (μm$^2$), a thickness of the capacitance detecting dielectric layer of $t_D$ (μm), a dielectric constant of the capacitance detecting dielectric layer of $\in_D$ or the like so that the element capacitance $C_D$ is sufficiently larger than $C_R+C_T$, a summation of the capacitance $C_R$ of the reference capacitor and the transistor capacitance $C_T$, and ideally, the electrostatic capacitance detection device is configured so that $C_R+C_T$, a summation of the capacitance $C_R$ of the reference capacitor and the transistor capacitance $C_T$, is sufficiently larger than the capacitance $C_A$ of the object when the object is apart from the capacitance detecting dielectric layer with an object distance of $t_A$ without contacting. More specifically, the electrostatic capacitance detection device is configured so that the element capacitance $C_D$, $C_R+C_T$, a summation of the capacitance $C_R$ of the reference capacitor and the transistor capacitance $C_T$, and the capacitance $C_A$ of the object satisfy a relation of $$C_D > 10 \times (C_R + C_T) > 100 \times C_A.$$

Furthermore, when a positive power supply is used for the power supply voltage $V_{dd}$, an enhancement type (normally off type) N type transistor is preferably used as the MIS type thin film semiconductor device for signal amplification, and the minimum gate voltage $V_{min}$ of this N type transistor satisfies a relation of $$0 < 0.1 \times V_{dd} < V_{min} \text{ or}$$

$$0 < \frac{V_{dd}}{1 + \frac{C_D}{(C_R + C_T)}} < V_{min}$$

And furthermore, ideally, an enhancement type N type transistor, in which the threshold voltage $\underline{V}_{th}$ is smaller than the $V_{GV}$, that is, satisfying a relation of $$0 < V_{th} < 0.91 \times V_{dd} \text{ or}$$

$$0 < V_{th} < \frac{V_{dd}}{1 + \frac{C_A}{(C_R + C_T)}},$$

is used.

On the other hand, when a negative power supply is used for the power supply voltage $V_{dd}$, an enhancement type (normally off type) P type transistor is preferably used as the MIS type thin film semiconductor device for signal amplification, and the minimum gate voltage $V_{min}$ of this P type transistor satisfies a relation of $$V_{min} < 0.1 \times V_{dd} < 0 \text{ or}$$

$$V_{min} < \frac{V_{dd}}{1 + \frac{C_D}{(C_R + C_T)}} < 0$$

And furthermore, ideally, an enhancement type P type transistor, in which the threshold voltage $V_{th}$ is larger than the $V_{GV}$, that is, satisfying a relation of $$0.91 \times V_{dd} < V_{th} < 0 \text{ or}$$

$$\frac{V_{dd}}{1 + \frac{C_A}{(C_R + C_T)}} < V_{th} < 0,$$

is used.

Figure 6:
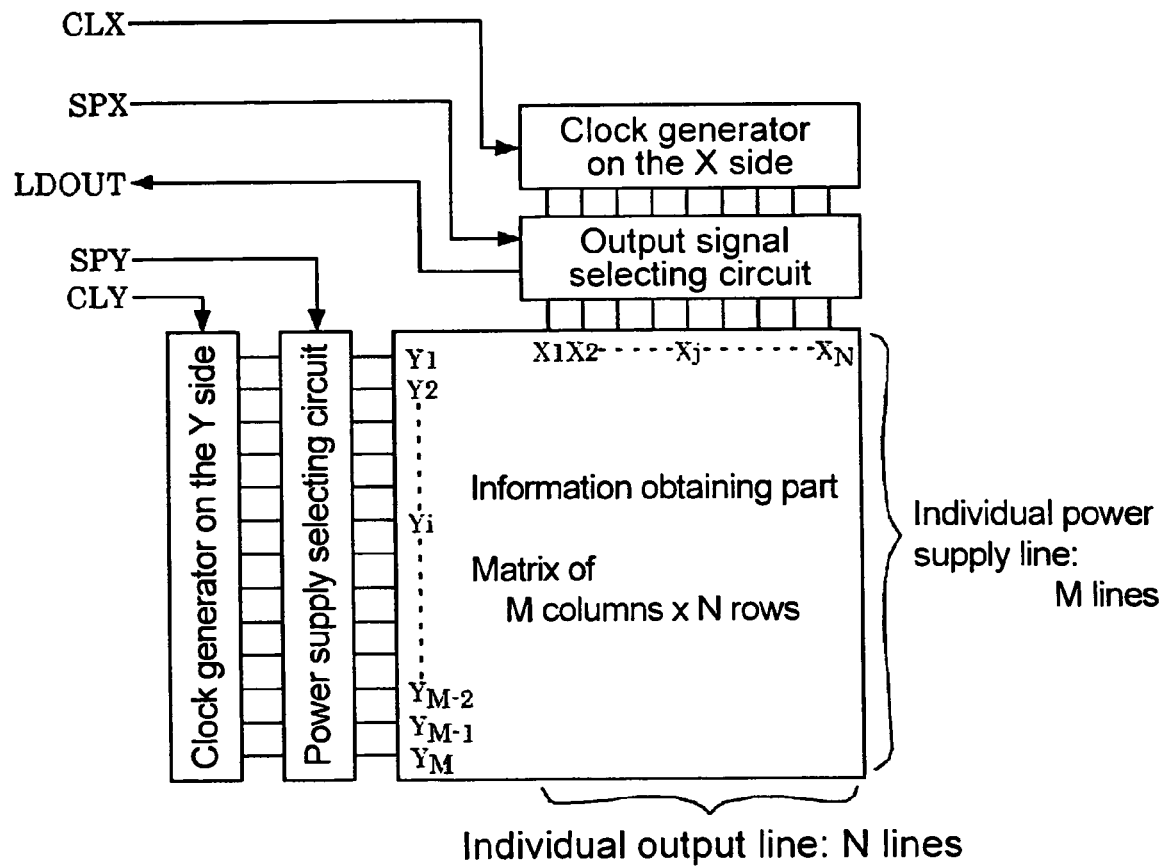
FIG. 6 is a diagram explaining an overall configuration of the present invention.

Next, an overall configuration of the electrostatic detecting device according to the present invention is described with reference to FIG. 6. The electrostatic capacitance detection device, which reads surface contours of an object, is formed of M (M is an integer one or more) individual power supply lines and N (N is an integer one or more) individual output lines, arranged in a matrix of M rows×N columns, and electrostatic capacitance detection elements provided on the crossing points of the individual power supply lines and the individual output lines. Each of the electrostatic capacitance detection elements is formed of a capacitance detecting electrode, a capacitance detecting dielectric layer, a reference capacitor and a signal amplification element, and detects an electrostatic capacitance, which changes according to the distance with the object. Because the electrostatic capacitance detection elements are arranged in a matrix of M rows×N columns, each of the columns and the rows has to be sequentially scanned and each of the M×N electrostatic capacitance detection elements has to be selected in a proper order in order to read surface contours. An output signal selecting circuit determines in what order detected signals are read out from each of the electrostatic capacitance detection elements. The output signal selecting circuit is formed of a common output line and a path gate for output signal, and selects an individual output line from N individual output lines for outputting an output signal. The output signal selecting circuit operates using a clock signal supplied from a clock generator on the X side.

Figure 7:
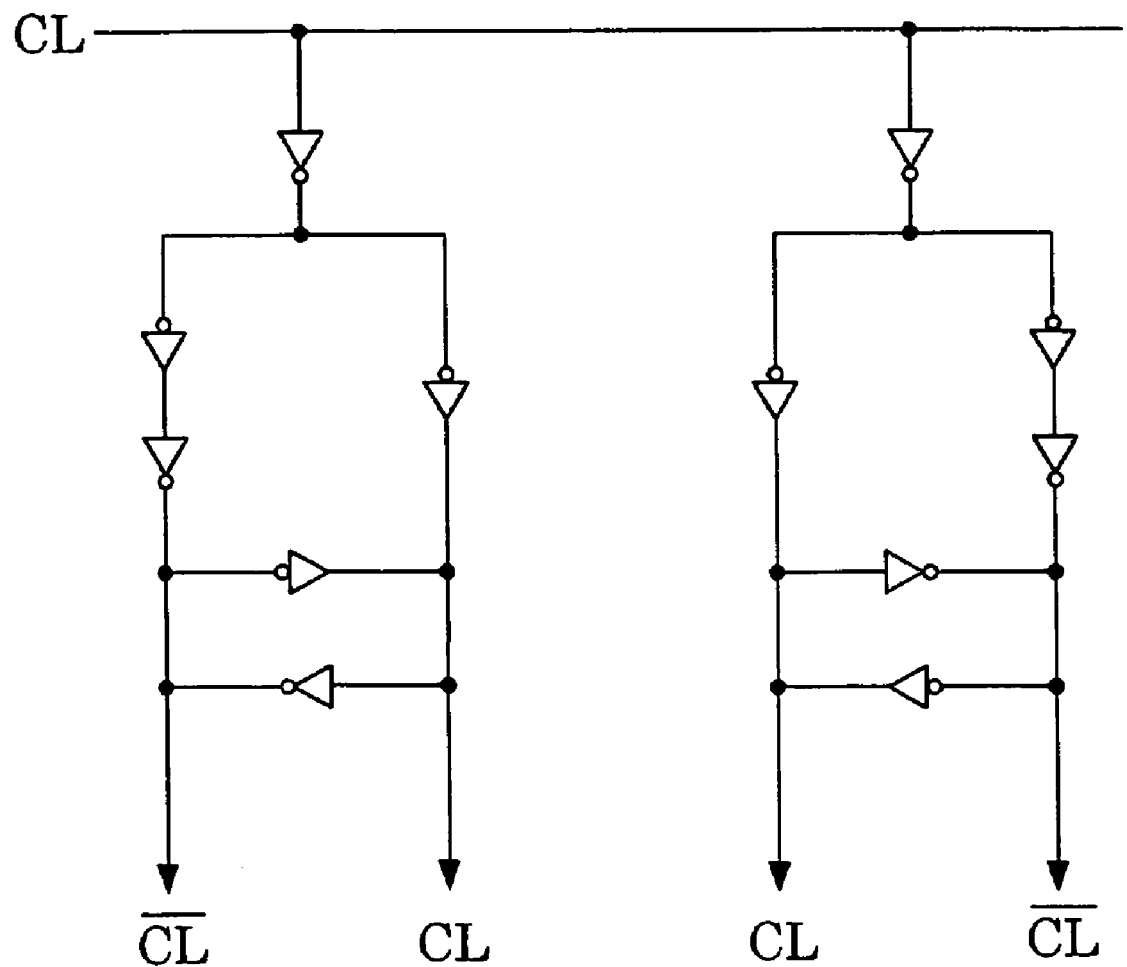
FIG. 7 is a diagram explaining a clock generator circuit of the present invention.
Figure 9:
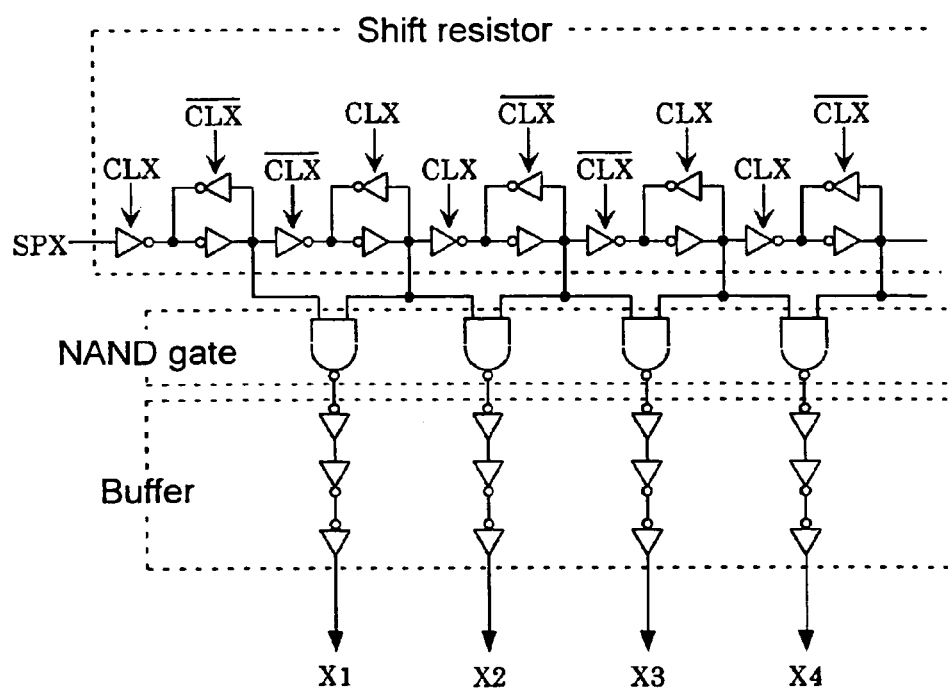
FIG. 9 is a diagram explaining an output signal selecting circuit configuration of the present invention.

A circuit diagram of the clock generator is shown in FIG. 7. In order that the output signal selecting circuit selects an output signal to be outputted, the output signal selecting circuit preferably is formed of a shift register, a NAND gate and a buffer (FIG. 9). The shift register is configured by coupling a plurality of basic stages in series, whereas each of the basic stages is a series circuit of a flip-flop, formed of a clocked inverter and an inverter, and a clocked inverter. The outputs from the adjacent basic stages become the inputs to the NAND gate, and an output of the NAND gate is used as an output selecting signal after reverse-amplifying with the buffer. The output selecting signal is outputted to an output line for output selection, and controls an operation of the path gate for output signal (FIG. 10).

The signal amplification element in each of the electrostatic capacitance detection elements can be formed of a MIS type thin film semiconductor device for signal amplification, including a gate electrode, a gate insulating layer and a semiconductor layer. The path gate for output signal is formed of a MIS type thin film semiconductor device for output signal path gate, including a gate electrode, a gate insulating layer and a semiconductor layer. In the present invention, the source region of the MIS type thin film semiconductor device for signal amplification is connected to each of the individual output lines, the drain region of the MIS type thin film semiconductor device for signal amplification element is connected to each of the individual power supply lines and the reference capacitor first electrode, and the gate electrode of the MIS type thin film semiconductor device for signal amplification element is connected to the capacitance detecting electrode and the reference capacitor second electrode. (In FIG. 10, the source region, the drain region and the gate electrode of the MIS type thin film semiconductor device are indicated by S, D and G, respectively.) Thus, each of the individual power supply lines and the individual output lines are mutually coupled via the channel forming region, which responds to an electric charge Q detected by the capacitance detecting electrode.

Figure 10:
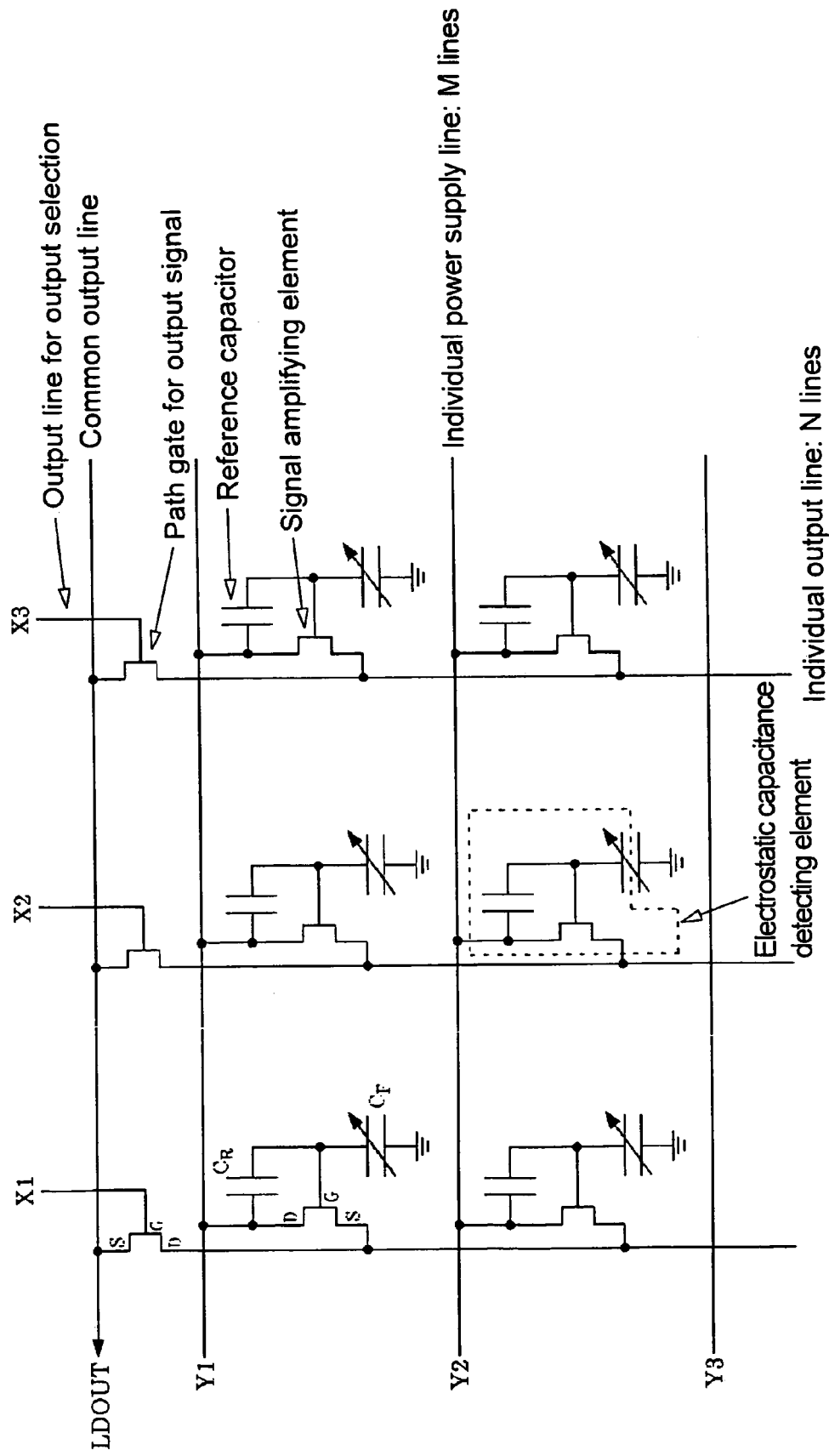
FIG. 10 is a diagram explaining an information obtaining part circuit configuration of the present invention.

In the invention, the source region of the MIS type thin film semiconductor device for output signal path gate is connected to the common output line, the drain region of the MIS type thin film semiconductor device for output signal path gate is connected to each of the individual output lines, and the gate electrode of the MIS type thin film semiconductor device for output signal path gate is connected to the output line for output selection, which supplies a signal for selecting what individual output line from the N individual output lines (FIG. 10). As described above, each of the output lines for output selection may be coupled to each of the output stages (reverse-amplified output of the NAND gate, which received outputs from the adjacent basic stages) of the shift register for output signal (in case of FIG. 10), or may be coupled each of the output stages of a decoder for output signal in place of the shift register for output signal. The shift register for output signal sequentially supplies the selection signals, which are transferred to the N output stages. Furthermore, the decoder for output signal selects a certain output stage from N output stages depending on the input signal to the decoder. Thus, the selection signal is sequentially inputted to the N path gates for output signal, as required, as a result, N individual output lines are electrically conducted to the common output line sequentially.

Figure 8:
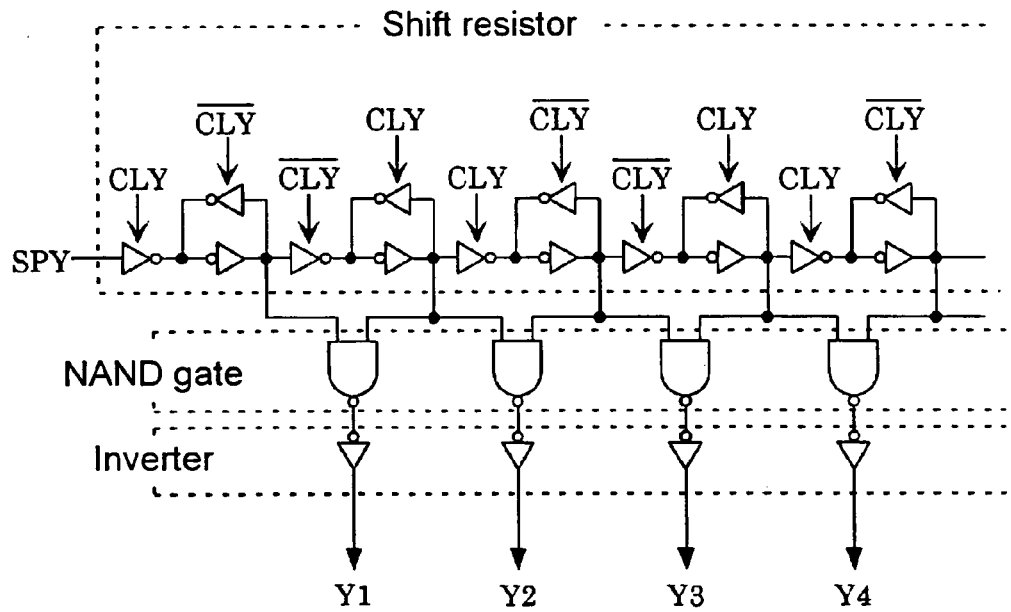
FIG. 8 is a diagram explaining a power supply selecting circuit configuration of the present invention

The power supply selecting circuit selects a certain individual power supply line from M individual power supply lines, and supplies power to the selected individual line. Whether each of the individual power supply lines can be selected or not depend on the presence or the absence of the power supply (FIG. 6). The power supply selecting circuit uses a clock signal supplied by a clock generator on the Y side. A circuit diagram of the clock generator is shown in FIG. 7. In order that the power supply selecting circuit selects a certain individual power supply line, the power supply selecting circuit preferably is formed of a shift register, a NAND gate and an inverter (FIG. 8). The shift register is configured by coupling a plurality of basic stages in series, whereas the basic stage is a series circuit of a flip-flop, formed of a clocked inverter and an inverter, and a clocked inverter. The outputs from the adjacent basic stages become the inputs to the NAND gate, and an output of the NAND gate is used as the power supply selecting signal after reverse-amplifying with the inverter. The power supply selecting signal is outputted to the each of the individual power supply lines. When the certain individual power supply line is selected in this way, the selected individual power supply line is conducted to the power supply $V_{dd}$. On the other hand, unselected individual power supply lines have a ground potential ($V_{ss}$).

The power selection circuit may be coupled to each of the output stages (reverse-amplified output of the NAND gate, which received outputs from the adjacent basic stages) of the shift register, or may be coupled to each of the output stages of the decoder for power supply selection in place of the shift register shown in FIG. 8. The shift register for power supply selection sequentially supplies the selection signals, which are transferred to the M output stages. Furthermore, the decoder for power supply selection selects a certain output stage from M output stages depending on the input signal to the decoder. Thus, M individual power supply lines are conducted to the power supply ($V_{dd}$) sequentially or as required.

In order that the electrostatic capacitance detection device functions in this configuration, the individual output lines and the common output line are wired by the first wiring, the individual power supply lines and the output lines for output selection are wired by the second wiring, and the capacitance detecting electrode are wired by the third wiring. And the first, second, and third wirings have to be electrically insulated via the insulating layers. This configuration eliminates redundant wirings, thereby minimizes the parasitic capacitance generated between wirings, and detecting a small amount of electrostatic capacitance with high sensitivity.

Such an electrostatic capacitance detection element can be formed on a plastic substrate by using the above-described SUFTLA technology. A fingerprint sensor on a plastic substrate using the single crystal silicon technology is lack of practicability because it cracks in short period, and has an insufficient size. On the other hand, the electrostatic capacitance detection element on a plastic substrate according to the present invention can be used as a fingerprint sensor on a plastic substrate because there is no concern that it cracks even when the area is large enough to cover a finger on the plastic substrate. Specifically, the present invention realizes a smart card with a function of the personal authentication. The smart card with a function of the personal authentication can be used for a cash card (bank card), a credit card and an identification card (ID card), and remarkably improves security level for these cards, and has an excellent function of protecting the personal fingerprint information without leaking out of the card.

An electrostatic capacitance detection device, formed of a thin film semiconductor device, is manufactured on a glass substrate, and the electrostatic capacitance detection device is transferred onto a plastic substrate by using the SUFTLA technology, and then the electrostatic capacitance detection device is manufactured on the plastic substrate. The electrostatic capacitance detection device is formed of electrostatic capacitance detection elements, arranged in a matrix of 300 columns×300 rows. The matrix is a square of 20.32 mm in each side.

The substrate is made of polyethersulfone (PES) with a thickness of 400 μm. Each of the MIS type thin film semiconductor device for signal amplification, the MIS type thin film semiconductor device for output signal path gate, the MIS type thin film semiconductor device for the selection circuit for output signal, the MIS type thin film semiconductor device forming the power supply selecting circuit is made of a thin layer transistor. Except for the MIS type thin film semiconductor device for signal amplification, the each thin layer transistor has a same cross-sectional structure, and an NMOS transistor is formed of a so-called lightly doped drain (LDD) structure thin layer transistor, and a PMOS transistor is formed the thin layer transistor of a self-aligned structure. The thin layer transistor forming the MIS type thin film semiconductor device for signal amplification is of a top gate type as shown in FIG. 4, whereas the source electrode side is of a self-aligned structure (the gate electrode end and the source region end are substantially matched), and the drain electrode side is of a non-self aligned structure (the gate electrode and the drain region have an overlapped portion). Because the drain electrode side is of the non-aligned structure, this portion becomes a reference capacitor. In other words, the signal amplification element and the reference capacitor are integrally formed.

The thin film semiconductor device can be made in a low temperature process, in which the maximum temperature is 425° C. The semiconductor layer is a polycrystal silicon thin layer obtained by the laser crystallizing method, having a thickness of 59 nm. And, the gate insulating layer is a silicon oxide layer having a thickness of 45 nm formed by the chemical vapor deposition method (CVD method), and the gate electrode is made of tantalum thin layer having a thickness of 400 nm. The dielectric constant of the silicon oxide layer forming the gate insulating layer is determined as approximately 3.9 by the CV measurement. The first interlayer insulating layer and the second interlayer insulating layer can be silicon oxide layer formed by the CVD method using tetraethylorthosilicate (TEOS: Si(OCH$_2$CH$_3$)$_4$) and oxygen as materials. It is preferable that the first interlayer insulating layer is approximately 20% or more thicker than the gate electrode (400 nm for the embodiment), and thinner than the second interlayer insulating layer. This is because the gate electrodes can be securely covered and a short-circuit between the gate electrode and the first wiring or the second wiring can be prevented, and at the same time, the second interlayer insulating layer can be thickened. In the embodiment, the first interlayer insulating layer has a thickness of 500 nm.

The third interlayer insulating layer insulates the second wiring and the capacitance detecting electrode and prevents a short-circuit. The first wiring and the capacitance detecting electrode are insulated by the second interlayer insulating layer and the third insulating layer. Therefore, in order to minimize the parasitic capacitance generated between the first wiring and the capacitance detecting electrode, and to realize the electrostatic capacitance detection device with high sensitivity, it is preferable that the dielectric constant of the second interlayer insulating layer and the third interlayer insulating layer are as small as possible and their thickness are as thick as possible. However, when the total thickness of the silicon oxide deposited by the CVD method exceeds approximately 2 μm, the silicon oxide layer may be cracked and the yield may be lowered. Accordingly, a total thickness of the first interlayer insulating layer, the second interlayer insulating layer and the third interlayer insulating layer is set to approximately 2 μm or less. This increases the productivity of the electrostatic capacitance detection device.

As described above, because the second interlayer insulating layer and the third interlayer insulating layer are preferably thicker, they are made thicker than the first interlayer insulating layer. Ideally, the first interlayer insulating layer is approximately 20% or more thicker than the gate electrode, the second interlayer insulating layer and the third interlayer layer are thicker than the first interlayer insulating layer, and the total thickness of the first interlayer insulating layer, the second interlayer insulating layer the third interlayer layer is approximately 2 µm or less. In the embodiment, the second interlayer insulating layer has a thickness of 1 µm. The first wiring and the second wiring are made of aluminum having a thickness of 500 nm, and a width of the wiring is 5 µm. The common output line and the individual output lines are formed by the first wiring, and the individual power supply lines, the output lines for output selection, and the capacitance detecting electrode is formed by the second wiring. The gap between each of the individual power supply lines and the capacitance detecting electrode is 5 µm, and the gap between each of the individual output lines and the capacitance detecting electrode is also 5 µm.

In the embodiment, the pitch of the matrix forming the electrostatic capacitance detection device is 66.7 µm, and the resolution is set to 381 dpi (dots per inch). Accordingly, the capacitance detecting electrode has a size of 55.0 µm×55.0 µm. The capacitance detecting dielectric layer is formed by a silicon nitride layer having a thickness of 350 nm. The dielectric constant of the silicon nitride layer is approximately 7.5 by the CV measurement, therefore, the element capacitance $C_D$ becomes approximately 574 fF (femto-Farad). When the electrostatic capacitance detection device is supposed to be a fingerprint sensor, the capacitance $C_A$ of the object is calculated to be 0.54 fF when a valley of a fingerprint is above the surface of the electrostatic capacitance detection device because the indentation of the fingerprint is approximately 50 µm. On the other hand, the electrode length of the MIS type thin film semiconductor device for signal amplification is set to 7 µm, in which a length of the reference capacitor part ($L_1$) is 4.5 µm, and a length of the transistor part (length of the channel forming $L_2$) is 2.5 µm. Because a width of the gate electrode is 10 µm, a summation of the transistor capacitance $C_T$ and the capacitance $C_R$ of the reference capacitor becomes approximately 53.7 fF. Thus, the electrostatic capacitance detection element in the embodiment satisfies a relation of $$C_D > 10 \times (C_R + C_T) > 100 \times C_A.$$

Accordingly, when the power supply voltage $V_{dd}$ is set to 3.3 V, the $V_{GT}$ applied on the gate electrode of the MIS type thin film semiconductor device for signal amplification becomes 0.16 V when a ridge of a fingerprint contacts the surface of the electrostatic capacitance detection device, and the voltage $V_{GV}$ applied on the gate electrode becomes 3.22 V when a valley of a fingerprint is above the surface of the electrostatic capacitance detection device.

Figure 11:
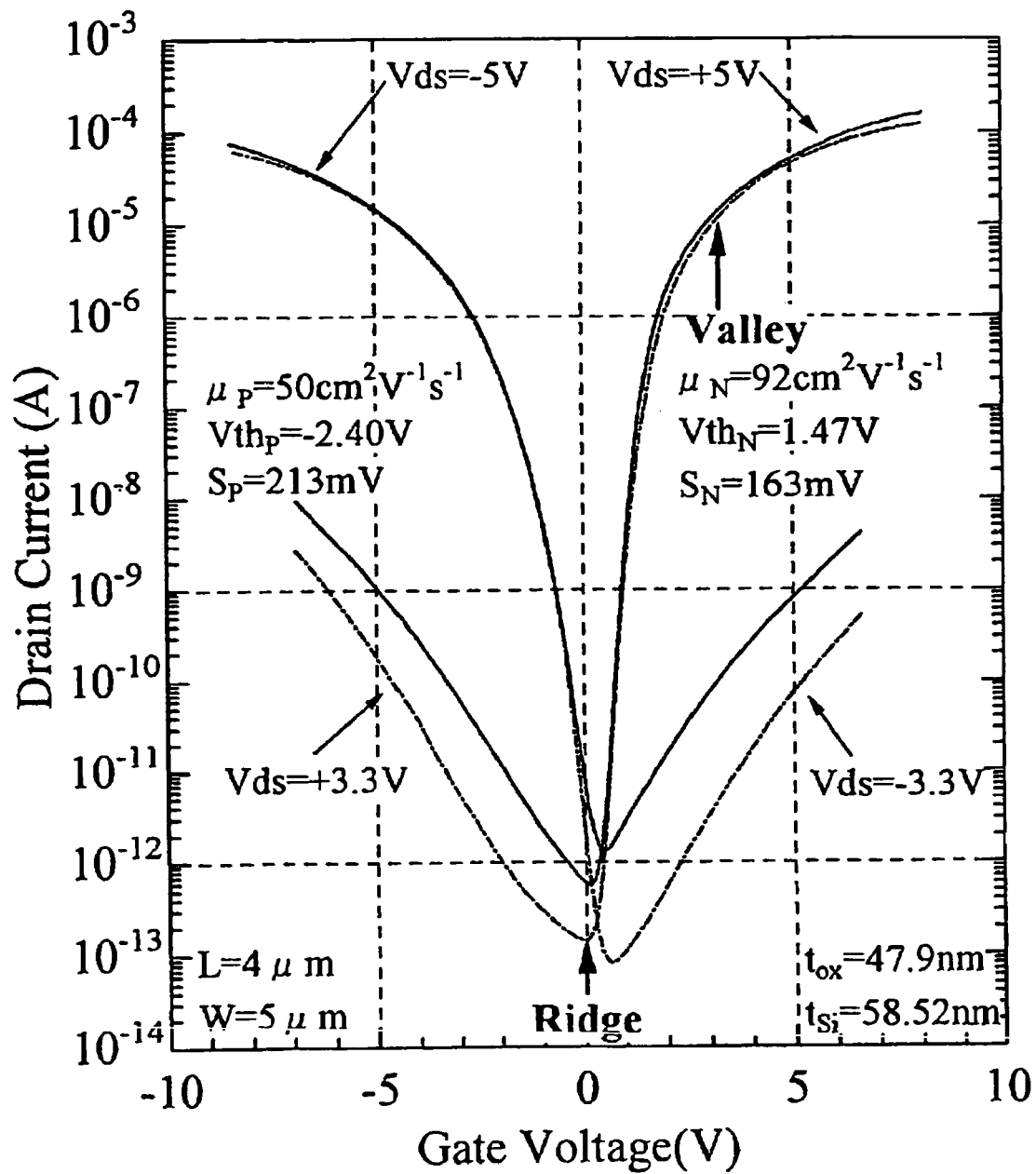
FIG. 11 is a transfer characteristic diagram of a thin film semiconductor device used in the embodiment.

FIG. 11 shows a transfer characteristic of the MIS type thin film semiconductor device used in the embodiment. The shift register for output signal is of a CMOS structure, and each of the MIS type thin film semiconductor device for signal amplification and the MIS type thin film semiconductor device for output signal path gate is formed by an NMOS transistor. The minimum gate voltage $V_{min}$ of the MIS type thin film semiconductor device for signal amplification is 0.1 V, which does not satisfy a relation of $$0 < 0.1 \times V_{dd} < V_{min},$$

however, the drain current is made smaller than 1 pA ($10^{-12}$ A) with $V_{GT}=0.16$, thereby, detecting the ridge of a fingerprint with ease. On the other hand, the threshold voltage $V_{th}$ is 1.47 V, which satisfies a relation of $$0 < V_{th} < 0.91 \times V_{dd} = 3.00 \text{ V}.$$

As a result, when a ridge of a fingerprint contacts the surface of the electrostatic capacitance detection device, the current value outputted from the signal amplification element becomes $5.6 \times 10^{-13}$ A, which is significantly small. On the other hand, when a valley of a fingerprint is above the surface, a large current of $2.4 \times 10^{-5}$ A is outputted from the signal amplification element, thereby, the indentation information such as a fingerprint can be detected with high precision.

While the invention has been described in conjunction with specific embodiments thereof, it is evident that many alternatives, modifications and variations will be apparent to those skilled in the art. Accordingly, preferred embodiments of the invention as set forth herein are intended to be illustrative, not limiting. There are changes that may be made without departing from the spirit and scope of the invention.

What is claimed is:

1. An electrostatic capacitance detection device for reading surface contours of an object by detecting an electrostatic capacitance, which changes according to a distance with the object, comprising:

M individual power supply lines and N individual output lines, arranged in a matrix of M rows×N columns, and electrostatic capacitance detection elements provided on crossing points of the individual power supply lines and the individual output lines;

each of the electrostatic capacitance detection elements being formed of a signal detection element and a signal amplification element, the signal detection element being formed of a capacitance detecting electrode, a capacitance detecting dielectric layer and a reference capacitor, the reference capacitor being formed of a reference capacitor first electrode, a reference capacitor dielectric layer and a reference capacitor second electrode, the signal amplification element being formed of a MIS type thin film semiconductor device for signal amplification, including a gate electrode, a gate insulating layer and a semiconductor layer, and a drain region of the MIS type thin film semiconductor device for signal amplification being electrically coupled to the individual power supply lines and the reference capacitor first electrode, and the gate electrode of the MIS type thin film semiconductor device for signal amplification being coupled to the capacitance detecting electrode and the reference capacitor second electrode.

2. The electrostatic capacitance detection device according to claim 1, the reference capacitor dielectric layer and the gate insulating layer of the MIS type thin film semiconductor device for signal amplification being formed with a same material on a same layer.

3. The electrostatic capacitance detection device according to claim 1, the reference capacitor first electrode and a drain region of the semiconductor film being formed with a same material on a same layer.

4. The electrostatic capacitance detection device according to claim 1, the reference capacitor second electrode and the gate electrode being formed with a same material on a same layer.

5. The electrostatic capacitance detection device according to claim 1, the capacitance detecting dielectric layer being located on an uppermost surface of the electrostatic capacitance detection device.

6. An electrostatic capacitance detection device, comprising:

a plurality of power supply lines;
   a plurality of output lines; and a plurality of electrostatic capacitance detection elements arranged corresponding to intersections of the plurality of power supply lines and the plurality of output lines, each of the electrostatic capacitance detection elements including:
 a signal detection element, the signal detection element including:
  a capacitance detecting electrode;
  a capacitance detecting dielectric layer; and
  a reference capacitor, the reference capacitor including:
   a first electrode;
   a dielectric layer; and
   a second electrode; and
 a signal amplification element, the signal amplification element including:
  a thin film semiconductor device, the thin film semiconductor device including:
   a source electrode;
   a drain electrode, one of the source electrode and the drain electrode being electrically coupled to a corresponding power supply line of the plurality of power supply lines and the first electrode; and
   a gate electrode being electrically coupled to the capacitance detecting electrode and the second electrode.

* * * * *